(12) United States Patent
Ahn

(10) Patent No.: US 11,830,155 B2
(45) Date of Patent: Nov. 28, 2023

(54) ELECTRONIC DEVICE AND OPERATING METHOD THEREOF

(71) Applicant: SAMSUNG ELECTRONICS CO., LTD., Suwon-si (KR)

(72) Inventor: Sangjun Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 111 days.

(21) Appl. No.: 17/601,874

(22) PCT Filed: Oct. 5, 2021

(86) PCT No.: PCT/KR2021/013590
§ 371 (c)(1),
(2) Date: Oct. 6, 2021

(87) PCT Pub. No.: WO2022/075686
PCT Pub. Date: Apr. 14, 2022

(65) Prior Publication Data
US 2023/0186571 A1    Jun. 15, 2023

(30) Foreign Application Priority Data

Oct. 6, 2020  (KR) .......... 10-2020-0128875

(51) Int. Cl.
*G06T 19/00* (2011.01)
*G06F 3/14* (2006.01)

(52) U.S. Cl.
CPC .............. *G06T 19/006* (2013.01); *G06F 3/14* (2013.01)

(58) Field of Classification Search
CPC ..... G06T 19/006; G06T 19/00; G06T 19/003; G06F 3/14; G06N 20/00; H04N 13/361
See application file for complete search history.

(56) References Cited

U.S. PATENT DOCUMENTS

| | | | |
|---|---|---|---|
| 9,892,323 B2 | 2/2018 | Cho et al. | |
| 10,068,382 B2* | 9/2018 | Kaino | ............ G06T 7/70 |
| 10,281,981 B2 | 5/2019 | Kim et al. | |
| 10,304,248 B2 | 5/2019 | Woo et al. | |
| 11,093,804 B1 | 8/2021 | Suezawa | |
| 2009/0322860 A1 | 12/2009 | Zhang et al. | |
| 2019/0188915 A1 | 6/2019 | Meier et al. | |

(Continued)

FOREIGN PATENT DOCUMENTS

| | | |
|---|---|---|
| KR | 10-2016-0001699 A | 1/2016 |
| KR | 10-2017-0081964 A | 7/2017 |

(Continued)

OTHER PUBLICATIONS

Communication dated Jan. 5, 2022 issued by the International Searching Authority in counterpart Application No. PCT/KR2021/013590 (PCT/ISA/220, PCT/ISA/210, and PCT/ISA/237).

*Primary Examiner* — Jeffery A Brier
(74) *Attorney, Agent, or Firm* — Sughrue Mion, PLLC

(57) ABSTRACT

Disclosed is an electronic device that includes: a camera; a display; a memory storing one or more instructions; and a processor configured to execute the one or more instructions to obtain, by the camera, an image including at least one object, identify an object type of the at least one object, obtain spatial information corresponding to the object type, based on the object type, and control the display, to display, a virtual object, based on the spatial information.

13 Claims, 14 Drawing Sheets

(56) References Cited

U.S. PATENT DOCUMENTS

| | | | |
|---|---|---|---|
| 2019/0385371 A1 | 12/2019 | Joyce et al. | |
| 2020/0402310 A1 | 12/2020 | Nidaira et al. | |
| 2021/0118235 A1 | 4/2021 | Hou et al. | |
| 2021/0208404 A1 | 7/2021 | Hoover et al. | |
| 2022/0270363 A1 | 8/2022 | Gotoh et al. | |

FOREIGN PATENT DOCUMENTS

| KR | 10-2017-0088655 A | | 8/2017 |
|---|---|---|---|
| KR | 10-1898075 B1 | | 9/2018 |
| KR | 102166586 B1 | * | 9/2018 |
| KR | 10-2019-0038886 A | | 4/2019 |
| KR | 10-2068489 B1 | | 1/2020 |
| KR | 101898075 B1 | * | 10/2020 |
| KR | 10-2021-0046591 A | | 4/2021 |

\* cited by examiner

ELECTRONIC DEVICE AND OPERATING METHOD THEREOF

TECHNICAL FIELD

The disclosure relates to the field of augmented reality, and in particular to an electronic device for displaying a virtual image by using a three-dimensional (3D) image of an object included in a two-dimensional (2D) image, and a method of operating the electronic device.

BACKGROUND ART

Augmented reality (AR) is technology that displays an image by projecting a virtual image onto a physical environment space of the real world or a real world object. An AR device enables a user wearing the AR device on his/her face or head to view a real scene and a virtual image together through a display module positioned in a see-through form in front of the user's eyes.

For the AR device to provide various services using a real world object, such as naturally displaying a virtual image on a real scene, the AR device needs to obtain required information about a real world space according to an AR service that will be provided to a user.

Accordingly, studies into a method of obtaining information about a real world space with a small amount of computation and providing an AR service at high speed are needed.

DESCRIPTION OF EMBODIMENTS

Technical Problem

Provided are an electronic device for displaying a virtual object by using a two-dimensional (2D) image obtained through a camera module, and a method of operating the electronic device.

Provided are an electronic device for displaying a virtual object by using spatial information corresponding to an object included in a 2D image, and a method of operating the electronic device.

Technical Solution to Problem

Embodiments of the disclosure overcome the above disadvantages and other disadvantages not described above. Also, the disclosure is not required to overcome the disadvantages described above, and an embodiment of the disclosure may not overcome any of the problems described above. Additional aspects of the disclosure will be set forth in part in the description which follows and additional aspects will be apparent from the description, or may be learned by practice of the disclosure.

In accordance with an aspect of the disclosure, an electronic device includes: a camera a display; a memory storing one or more instructions; and a processor configured to execute the one or more instructions to obtain an image comprising at least one object by the camera, identify an object type of the at least one object, obtain a spatial information corresponding to the object type, based on the object type, and control the display to display, a virtual object through the display, based on the spatial information.

In accordance with an aspect of the disclosure, a method of operating an electronic device includes: obtaining an image including at least one object through a camera identifying an object type of the at least one object; obtaining a spatial information corresponding to the object type, based on the object type; and controlling a display, to display a virtual object, based on the spatial information.

In accordance with an aspect of the disclosure, a computer-readable recording medium having recorded thereon a program for executing the above-described method on a computer may be provided.

BRIEF DESCRIPTION OF DRAWINGS

The above and other aspects and features of certain embodiments of the present disclosure will become apparent from the following description taken in conjunction with the accompanying drawings in which.

MODE OF DISCLOSURE

Figure 1:
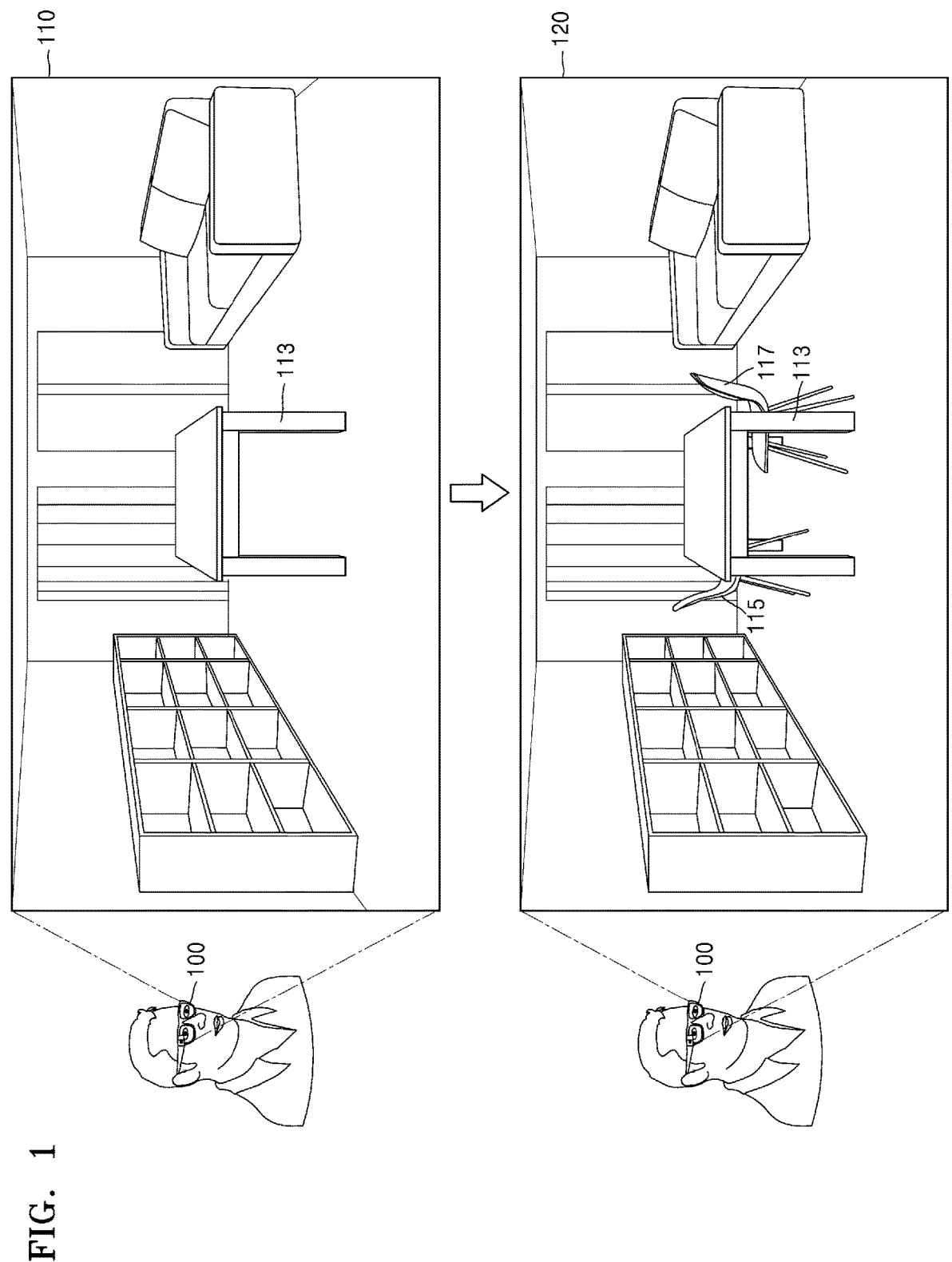
FIG. 1 is a view for schematically describing an embodiment.

Throughout the disclosure, the expression "at least one of a, b or c" indicates only a, only b, only c, both a and b, both a and c, both b and c, all of a, b, and c, or variations thereof.

Embodiments will be described with reference to the accompanying drawings. However, the disclosure is not limited to the embodiments described below, but may be implemented in several forms and may be variously modified. A description for these embodiments is provided only to make the disclosure complete and allow those skilled in the art to which the disclosure pertains to completely recognize the scope of the embodiments. In the accompanying drawings, sizes of components may be enlarged as compared with actual sizes for convenience of explanation, and ratios of the respective components may be exaggerated or reduced.

Although general terms being widely used were selected as terminology used in the disclosure while considering the functions of the disclosure, they may vary according to intentions of one of ordinary skill in the art, judicial precedents, the advent of new technologies, and the like. Hence, the terms used in the disclosure must be defined based on the meanings of the terms and the contents of the entire specification, not by simply stating the terms themselves.

Also, it will be understood that, although the terms first, second, etc. may be used herein to describe various components, these components should not be limited by these terms. These terms are only used to distinguish one component from another.

Also, the terms used in the disclosure are used to describe specific embodiments, not for the purpose of limiting the disclosure. It is to be understood that the singular forms "a," "an," and "the" include plural referents unless the context clearly dictates otherwise. Also, in this specification, it will be understood that the case in which a certain part is "connected" to another part includes the case in which the part is "electrically connected" to the other part with another device in between, as well as the case in which the part is "directly connected" to the other part. Also, it will be understood that when a certain part "includes" a certain component, the part does not exclude another component but can further include another component, unless the context clearly dictates otherwise.

The term "said" and the similar terms used in the present specification, specifically, in the claims may indicate both single and plural. Also, when the order of operations for describing a method according to the disclosure is not definitely specified, the operations may be performed in appropriate order. However, the disclosure is not limited to the order in which the operations are described.

The phrases "in some embodiments" or "according to an embodiment" appearing in the present specification do not necessarily indicate the same embodiment.

Some embodiments of the disclosure may be represented by functional block configurations and various processing operations. The entire or a part of the functional blocks may be implemented with various numbers of hardware and/or software configurations to execute specific functions. For example, the functional blocks of the disclosure may be implemented with one or more microprocessors, or with circuit configurations for predetermined functions. Also, for example, the functional blocks of the disclosure may be implemented with various programming or scripting languages. The functional blocks may be implemented with algorithms that are executed by one or more processors. Also, the disclosure may adopt typical technologies for electronic environment settings, signal processing, and/or data processing. The terms "mechanism", "element", "means", and "configuration" can be broadly used, and are not limited to mechanical and physical configurations.

Also, connection lines or connection members between components shown in the drawings are examples of functional connections and/or physical or circuital connections. In an actual apparatus, the connections between the components may be implemented in the form of various functional connections, physical connections, or circuital connections that can be replaced or added.

In the disclosure, 'augmented reality (AR)' means showing a virtual image in a physical environment space of a real world or showing a real world object and a virtual object together.

Also, an 'AR device' may be a device capable of representing 'AR', and may include, as well as AR glasses being in the form of glasses, which a user wears generally on his/her face, a head mounted display (HMD) apparatus that is mounted on a head, an AR helmet, etc.

Meanwhile, a 'real scene' may be a real world scene that a user views through an AR device, and may include a real world object. Also, a 'virtual image' may be an image generated through an optical engine, and include both a static image and a dynamic image. A virtual image may be shown together with a real scene, and may be an image representing information about a real world object in a real scene, information about an operation of an AR device, a control menu, etc.

Accordingly, a general AR device may include an optical engine for generating a virtual image configured with light generated from a light source, and a waveguide for guiding a virtual image generated by the optical engine to a user's eyes, the waveguide formed with a transparent material to enable the user to view the virtual image together with a real world scene. As described above, because the AR device needs to show a real world scene together with a virtual image, an optical element for changing a path of light basically having straightness may be needed to guide light generated by the optical engine to a user's eyes through the waveguide. The path of light may change through reflection by a mirror, etc. or through diffraction by a diffractive element, such as a diffractive optical element (DOE), a holographic optical element (HOE), etc., although not limited thereto.

Moreover, terms described in the specification such as "part," "module," and "unit," refer to a unit of processing at least one function or operation, and may be implemented by software, a hardware component such as a field-programmable gate array (FPGA) or an application-specific integrated circuit (ASIC), or a combination of software and hardware.

Reference numerals used for method steps are just used for convenience of explanation, but not to limit an order of the steps. Thus, unless the context clearly dictates otherwise, the written order may be practiced otherwise.

Hereinafter, embodiments according to the disclosure will be described in detail with reference to the accompanying drawings.

FIG. 1 is a view for schematically describing an embodiment.

The electronic device 100 according to an embodiment may be an augmented reality (AR) device. For example, as shown in FIG. 1, the electronic device 100 may be implemented in the form of glasses that a user may wear on his/her face. Also, the electronic device 100 may be implemented in the form of goggles, a helmet, a hat, etc. which a user mounts on his/her head, although not limited thereto.

Figure 3:
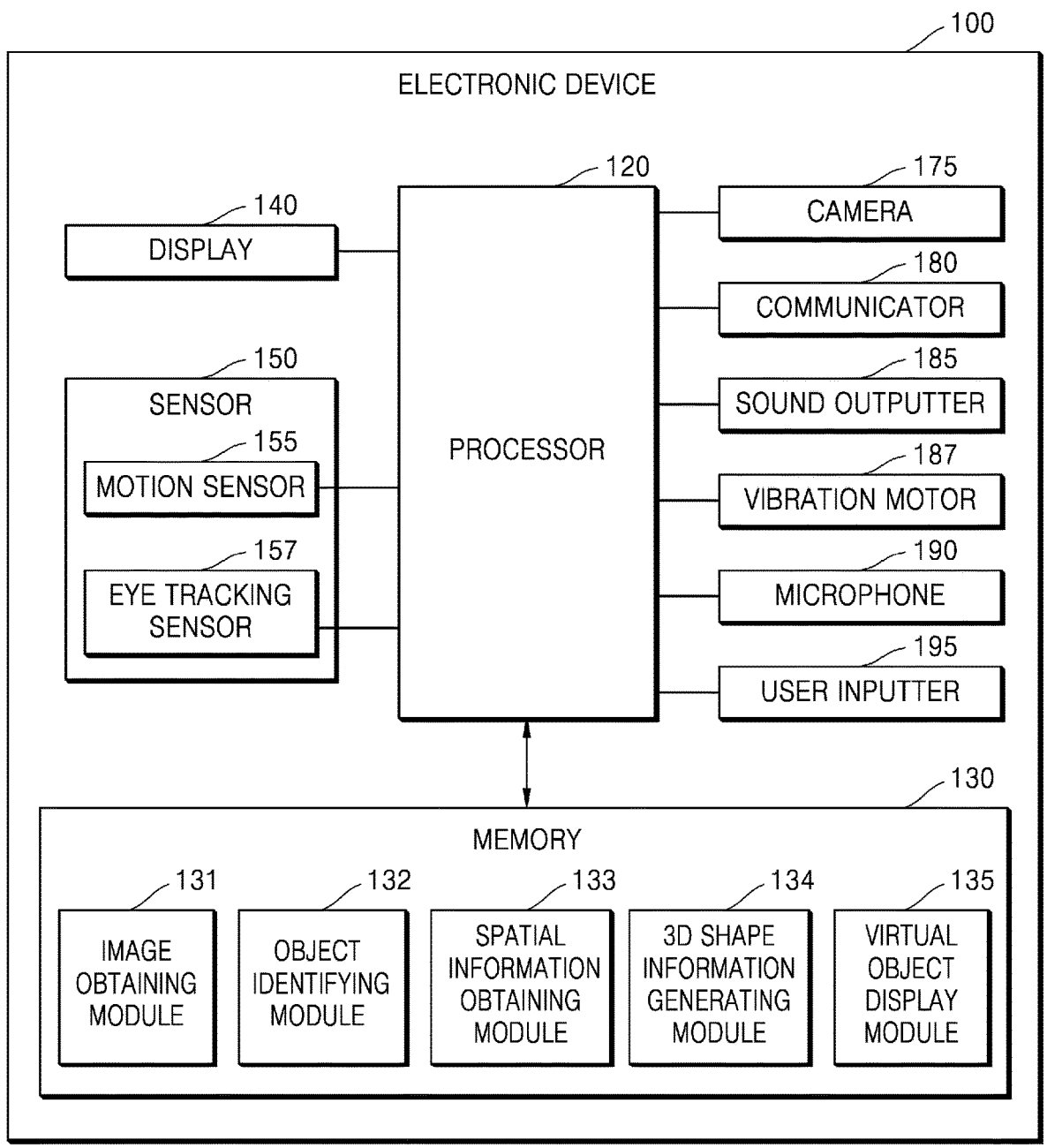
FIG. 3 is a block diagram of an electronic device according to an embodiment.

The electronic device 100 may display, when providing an AR service, a virtual object of a virtual image through a display 140 (see FIG. 3). For the electronic device 100 to realistically display a virtual object around a real world object, information about a shape, size, depth, orientation, etc. of the real world object may be needed.

As illustrated in FIG. 1, for example, a user may wear the electronic device 100 being in the form of glasses on his/her face and view a real scene 110. The real scene 110 may include a real object (for example, a table) 113. The electronic device 100 may display virtual objects 115 and 117 through the display 140 (see FIG. 3) such that the virtual objects 115 and 117 are shown by the user wearing the electronic device 100 as though they are positioned around the real object 113 in the real scene 110.

According to an embodiment, the electronic device 100 may perform rendering such that a part of the virtual objects 115 and 117, obstructed by the real object 113 in a direction which the user views, is omitted and the other part of the virtual objects 115 and 117, not obstructed by the real object 113 in the direction which the user views, is displayed by the display 140.

Accordingly, the electronic device 100 may provide, when displaying a virtual object, an obstruction effect with respect to an overlapping part between a real object and the virtual object. The obstruction effect is to realistically represent a virtual object around, in front of, or behind the real object. That is, the obstruction effect is to represent the virtual object, when it is assumed that the virtual object exists around real objects, as though the virtual object is positioned between the real objects, by displaying an area of the virtual object, located in front of the real objects, among overlapping areas between the virtual object and the real objects for a user and not displaying the other area of the virtual object, located behind the real objects.

To display a virtual object while distinguishing an area obstructed by a real object from an area not obstructed by the real object, the electronic device 100 according to an embodiment may photograph the real scene 110 through a camera 175 (see FIG. 3) of the electronic device 100 to obtain a two-dimensional (2D) image and use a spatial information about a real object included in the 2D image. The electronic device 100 may identify an object type of the real object included in the 2D image, and obtain the spatial information of the real object from an external server by using the identified object type. The electronic device 100 may display the virtual object around the real object by using the spatial information obtained from the external server.

A detailed method for displaying a virtual object by using a 2D image in the electronic device 100 will be described with reference to the drawings which will be described at a later time.

According to an embodiment, the electronic device 100 may provide an obstruction effect when displaying a virtual object, by using a 2D image generated by unidirectional photographing, without 360 degree photographing with a plurality of cameras or a depth sensor. Also, the electronic device 100 may provide an AR service of providing the obstruction effect at high speed with a small amount of computation, without having to perform a process of calculating depth information of an object, the process requiring a large amount of computation.

Figure 2:
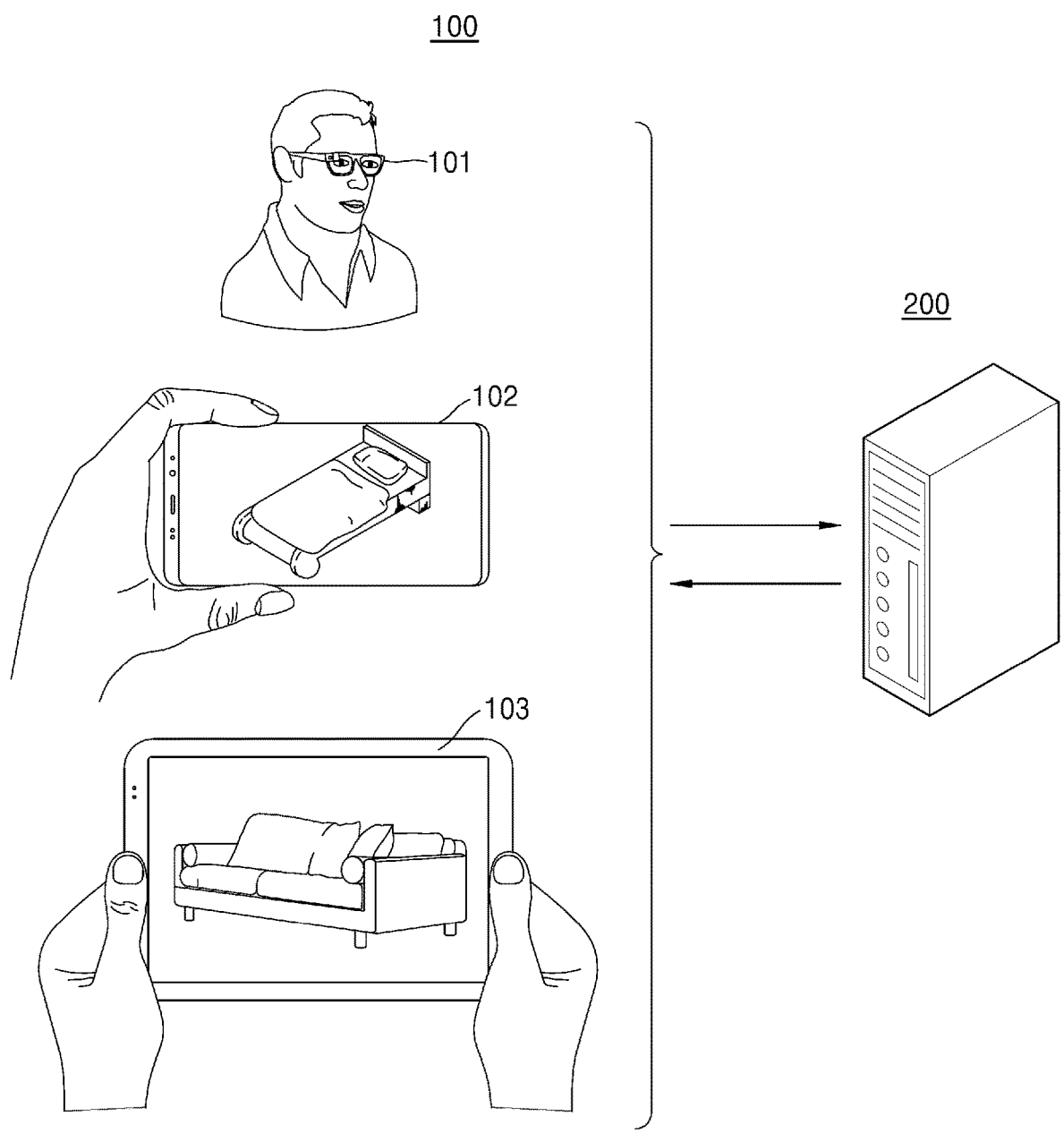
FIG. 2 is a view for describing operations of an electronic device according to an embodiment, and an external server.

FIG. 2 is a view for describing operations of an electronic device according to an embodiment and an external server.

The electronic device 100 according to an embodiment may be a mobile electronic device of a portable type, or a fixed type electronic device positioned at a fixed location. For example, in FIG. 2, the electronic device 100 may be a wearable device 101, a smart phone 102, a table personal computer (PC) 103, a laptop computer, a television (TV), a desktop computer, an e-book terminal, a digital broadcasting terminal, a personal digital assistant (PDA), a portable multimedia player (PMP), a digital camera, a camcorder, a navigation, a media player, a micro server, a global positioning system (GPS) device, or a MP3 player, although not limited thereto.

The electronic device 100 according to an embodiment may transmit/receive data to/from an external server 200 through a communication network.

The communication network according to an embodiment may be configured with at least one of a wired communication network or a wireless communication network. More specifically, the communication network may be mobile communication (for example, wireless broadband (Wibro), world interoperability for microwave access (Wimax), code division multiple access (CDMA), wideband code division multiple access (WCDMA), 3generation (3G), 4generation (4G), 5generation (5G), etc.), short-range communication (for example, near field communication (NFC), Bluetooth, wireless LAN (WLAN), wireless-fidelity (Wi-Fi), etc.), and/or low-power wide area communication (for example, TV white space (TVMS), weightless, etc.).

The electronic device 100 according to an embodiment may obtain spatial information corresponding to an object included in a 2D image from an external server 200.

The external server 200 according to an embodiment may store spatial information for object types. According to an embodiment, an object type may be information representing what the object is. An object type may be a common term used to name the same kind of the object. For example, referring to FIG. 1, an object type of the real object 113 included in the real scene 110 may be identified as a table.

According to an embodiment of the disclosure, the spatial information for object types may include information about three-dimensional (3D) shapes representing preset object types. In FIG. 1, the spatial information for object types may be information about a 3D shape representing the real object 113, for example, 'table'. For example, the server 200 may store spatial information including a 3D shape representing 'table' in correspondence to 'table'.

According to an embodiment, the spatial information for object types may be stored in a form of a table including 3D shapes corresponding to the individual object types, in a memory 230 (see FIG. 12) of the external server 200. Also, the spatial information for object types may be stored in a form of an algorithm for detecting the spatial information corresponding to the object types, in the memory 230 of the external server 200.

The electronic device 100 according to an embodiment may request the external server 200 to provide spatial information corresponding to an object type, and the external server 200 may transmit the spatial information corresponding to the object type to the electronic device 100 through a communication network in response to the request from the electronic device 100.

FIG. 3 is a block diagram of an electronic device according to an embodiment.

According to an embodiment, the electronic device 100 may be an AR device having a communication function and a data processing function and configured to provide AR images, although not limited thereto.

In FIG. 3, the electronic device 100 according to an embodiment may include a memory 130, a processor 120, a display 140, a sensor 150, a camera 175, a communicator 180, a sound outputter 185, a vibration motor 187, a microphone 190, and a user inputter 195. However, all components illustrated in FIG. 3 may not be indispensable components of the electronic device 100. The electronic device 100 may be implemented with more components than those illustrated in FIG. 3 or less components than those illustrated in FIG. 3.

The processor 120 of the electronic device 100 may execute programs stored in the memory 130 to control overall operations of the display 140, the sensor 150, the camera 175, the communicator 180, the sound outputter 185, the vibration motor 187, the microphone 190, the user inputter 195, etc.

The memory 130 according to an embodiment may store programs that are to be executed by the processor 120, and data input to the electronic device 100 or that is to be output from the electronic device 100.

The memory 130 may include at least one type of storage medium among a flash memory type, a hard disk type, a multimedia card micro type, a card type memory (for example, SD or XD memory), random access memory (RAM), static random access memory (SRAM), read only memory (ROM), electrically erasable programmable read-only memory (EEPROM), programmable read-only memory (PROM), a magnetic memory, a magnetic disk, or an optical disk.

The programs stored in the memory 130 may be classified into a plurality of software modules according to their functions, and for example, the software modules may include an image obtaining module 131, an object identifying module 132, a spatial information obtaining module 133, a 3D shape information generating module 134, and a virtual object display module 135, although not limited thereto. However, the software modules may store some of the above-mentioned modules or may further include another software module.

Also, according to an embodiment, the memory 130 may store a 2D image obtained through the camera 175. Also, the memory 130 may store spatial information for object types, received from the external server 200.

The processor 120 may control overall operations of the electronic device 100. The processor 120 may control operations or functions that are performed by the electronic device 100 by executing instructions or programs stored in the memory 130.

According to an embodiment, the processor 120 may be configured with a single processor or a plurality of processors. The processor 120 may include, for example, at least one hardware of a central processing unit (CPU), a microprocessor, a graphics processing unit (GPU), application specific integrated circuits (ASICs), digital signal processors (DSPs), digital signal processing devices (DSPDs), programmable logic devices (PLDs), or field programmable gate arrays (FPGAs), although not limited thereto. The processor 120 may obtain a 2D image through the camera 175 by executing the image obtaining module 131 stored in the memory 130.

According to an embodiment, the processor 120 may obtain a 2D image by photographing surroundings of the electronic device 100 through the camera 175 at preset time intervals after the electronic device 100 is powered on. Alternatively, the processor 120 may obtain a 2D image through the camera 175, when a preset application requiring displaying of a virtual object is executed.

For example, after a user wears the electronic device 100 on his/her face, the electronic device 100 may photograph a real scene of a photographable field of view (FOV) through the camera 175 at preset time intervals. In this case, an image obtained through the camera 175 may be a 2D image obtained by photographing a real 3D space in one direction.

The processor 120 may identify at least one object from the 2D image by executing the object identifying module 132 stored in the memory 130.

The processor 120 may detect at least one object included in the 2D image from the 2D image by using a preset object detection algorithm.

Also, according to an embodiment, the processor 120 may identify an object type of the detected object. The processor 120 may identify the object type of the object included in the 2D image by using a trained model trained by using an artificial intelligence (AI) algorithm to identify an object type of an object.

The processor 120 may obtain a spatial information corresponding to the object type of the object included in the 2D image from the external server 200, by executing the spatial information obtaining module 133 stored in the memory 130.

The processor 120 may transmit, to the external server 200 through the communicator 180, a spatial information request signal including information about the object type, based on the object type identified by the object identifying module 132. The external server 200 may determine spatial information corresponding to the object type received from the electronic device 100, based on the spatial information for object types, stored in the memory 230. The external server 200 may transmit the spatial information corresponding to the object type to the electronic device 100, through a communicator 280.

The processor 120 may generate 3D shape information corresponding to the object included in the 2D image by using the spatial information corresponding to the object type and obtained from the external server 200, by executing the 3D shape information generating module 134 stored in the memory 130.

According to an embodiment of the disclosure, the 3D shape information may be information about a 3D shape corresponding to a size and orientation of a real object included in the 2D image obtained by the camera 175.

According to an embodiment of the disclosure, the electronic device 100 may generate 3D shape information corresponding to the size and orientation of the real object included in the 2D image, based on the spatial information corresponding to the object type obtained from the external server 200.

The electronic device 100 may generate 3D shape information corresponding to the real object by adjusting a size and orientation of a 3D shape corresponding to the object type included in the spatial information obtained from the external server 200 such that the size and orientation of the 3D shape match with the size and orientation of the real object included in the 2D image approximately within a preset range.

The processor 120 may display a virtual object by using the 3D shape information, by executing the virtual object display module 135 stored in the memory 130.

According to an embodiment, the processor 120 may control the display 140 to display the virtual object, such that the virtual object looks as though it exists around the real object, by using the 3D shape information corresponding to the real object.

The processor 120 may control, when positioning the virtual object around the real object, the virtual object such that the virtual object is more realistically displayed between real objects, by not rendering an area of the virtual object obstructed by the real object among overlapping areas between the virtual object and the real object through the display 140 (see FIG. 3).

The display 140 may output information processed by the processor 120. For example, the display 140 may display the virtual object.

According to an embodiment, the display 140 may provide an AR image. The display 140 according to an embodiment of the disclosure may include a waveguide and a display module. The waveguide may be made of a transparent material such that a user wearing the electronic device 100 views outside through an area of the rear surface of the electronic device 100. The waveguide may be configured with a flat plate of a single-layer or multi-layer structure made of a transparent material to enable light to be reflected and propagate thereinside. The waveguide may be opposite to an exit surface of the display module to receive light of a projected virtual image. Herein, the transparent material means a material transmitting light. Transparency of the transparent material may be not 100%, and the transparent material may have a preset color.

According to an embodiment of the disclosure, because the waveguide is made of a transparent material, a user may view an outside real scene together with a virtual object of a virtual image, through the display 140. Therefore, the waveguide may be also called a see through display. The display 140 may output a virtual object of a virtual image through the waveguide, thereby providing an AR image.

The sensor 150 may include a motion sensor 155 and an eye tracking sensor 157.

The motion sensor 155 may be an inertial measurement unit (IMU). The IMU may be a combination of sensors configured to sense a motion of an object in a three-dimensional (3D) space, that is, changes in location and orientation. For example, the combination of sensors may include at least one of an accelerometer, a gyroscope, or a magnetometer.

Also, the motion sensor 155 may include at least one of an acceleration sensor, a magnetic sensor, or a gyroscope sensor.

The eye tracking sensor 157 may detect gaze information of a user's eye. According to an embodiment of the disclosure, the gaze information may include at least one of a gaze direction of the user's eye or a pupil position or pupil center coordinates of the user's eye.

The eye tracking sensor 157 may provide light to a user's eye (left or right eye), and sense an amount of light reflected from the user's eye. The eye tracking sensor 157 may detect a gaze direction, a pupil position, pupil center coordinates, etc. of the user's eye, based on the sensed amount of light.

Also, the eye tracking sensor 157 may provide light to the user's eye, and photograph the user's eye to generate an image of the user's eye. The eye tracking sensor 157 may detect a gaze direction, a pupil position, pupil center coordinates, etc. of the user's eye, based on the image of the user's eye.

The camera 175 may photograph surroundings of the electronic device 100. The camera 175 may obtain an image frame, such as a still image, a moving image, etc., through an image sensor, when an application requiring a photographing function is executed.

An image captured through the image sensor may be processed through the processor 120 or a separate image processor (not shown). Also, the captured image may be displayed on the display 140.

Also, an image frame processed by the processor 120 or the separate image processor (not shown) may be stored in the memory 130 or transmitted to outside through the communicator 180. Two or more camera 175 may be provided according to a configuration aspect of the electronic device 100.

According to an embodiment, the camera 175 may obtain a 2D image by photographing a real scene of surroundings of the electronic device 100 at preset time intervals. Also, the camera 175 may photograph, when an application requiring displaying of a virtual image is executed, a real scene of surroundings of the electronic device 100 to obtain a 2D image.

The communicator 180 may include at least one component for enabling communications between the electronic device 100 and the external server 200 or an external device (not shown).

For example, the communicator 180 may include a short-range communicator or a mobile communicator.

The short-range communicator may include a Bluetooth communicator, a short-range wireless communicator (NFC/RFID), a WLAN (Wi-Fi) communicator, a Zigbee communicator, an infrared data association (IrDA) communicator, a ultra wideband (UWB) communicator, an Ant+ communicator, etc., although not limited thereto.

The mobile communicator may transmit/receive a wireless signal to/from at least one of a base station, an external terminal, or a server on a mobile communication network. Herein, the wireless signal may include a voice call signal, a video call signal or various formats of data according to transmission/reception of text/multimedia messages.

According to an embodiment, the electronic device 100 may transmit a spatial information requesting signal including information about an object type to the external server 200, through the communicator 180. The electronic device 100 may receive spatial information corresponding to the object type from the external server 200, through the communicator 180.

The sound outputter 185 may output audio data received from the communicator 180 or stored in the memory 130. Also, the sound outputter 185 may output a sound signal related to a function (for example, call signal ringtone, message ringtone, and notification sound) that is performed in the electronic device 100.

The sound outputter 185 according to an embodiment may include a speaker, a buzzer, etc. The sound outputter 185 according to an embodiment of the disclosure may be implemented in a form of earphones that are installed in or detachably attached to the electronic device 100. Also, the sound outputter 185 according to an embodiment of the disclosure may output sound by bone conduction.

The vibration motor 187 may output a vibration signal. For example, the vibration motor 187 may output vibration signals corresponding to outputs of audio data or video data (for example, call signal ringtone, message ringtone, etc.). Also, the vibration motor 187 may output a vibration signal when a user input is received by the user inputter 195. Also, the vibration motor 187 may provide notification as vibrations when the electronic device 100 operates in a vibration mode.

The microphone 190 may receive an external sound signal and process the external sound signal to electrical voice data. For example, the microphone 190 may receive a sound signal from an external device or a speaker. Also, the microphone 190 may receive a user's voice input for controlling the electronic device 100. The microphone 190 may use various noise removal algorithms for removing noise generated in a process of receiving an external sound signal.

The user inputter 195 may be a device for enabling a user to input data for controlling the electronic device 100. For example, the user inputter 195 may include at least one of a key pad, a dome switch, a touch pad (a contact capacitive type, a pressure resistive type, an infrared beam type, a surface acoustic wave type, an integral strain gauge type, a piezo effect type, etc.), a jog wheel, or a jog switch, although not limited thereto.

Figure 4:
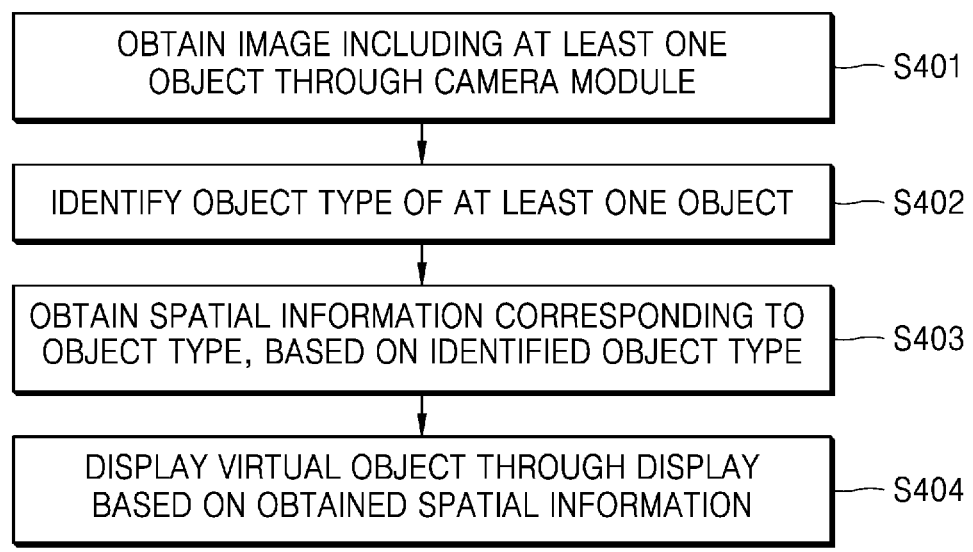
FIG. 4 is a flowchart for describing operations of an electronic device according to an embodiment.
Figure 5:
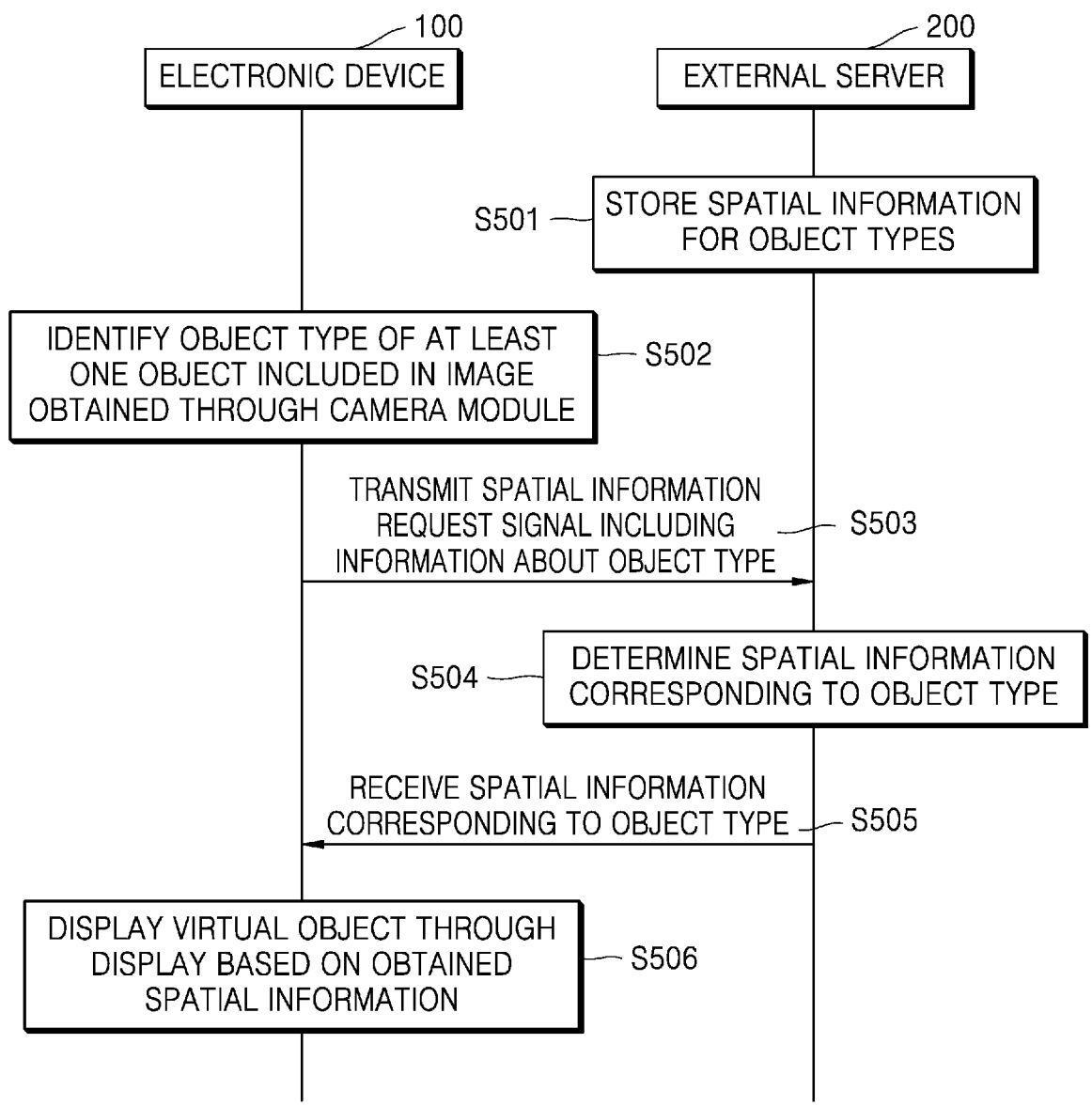
FIG. 5 is a flowchart for describing a method of obtaining spatial information from an external server in an electronic device, according to an embodiment.
Figure 6:
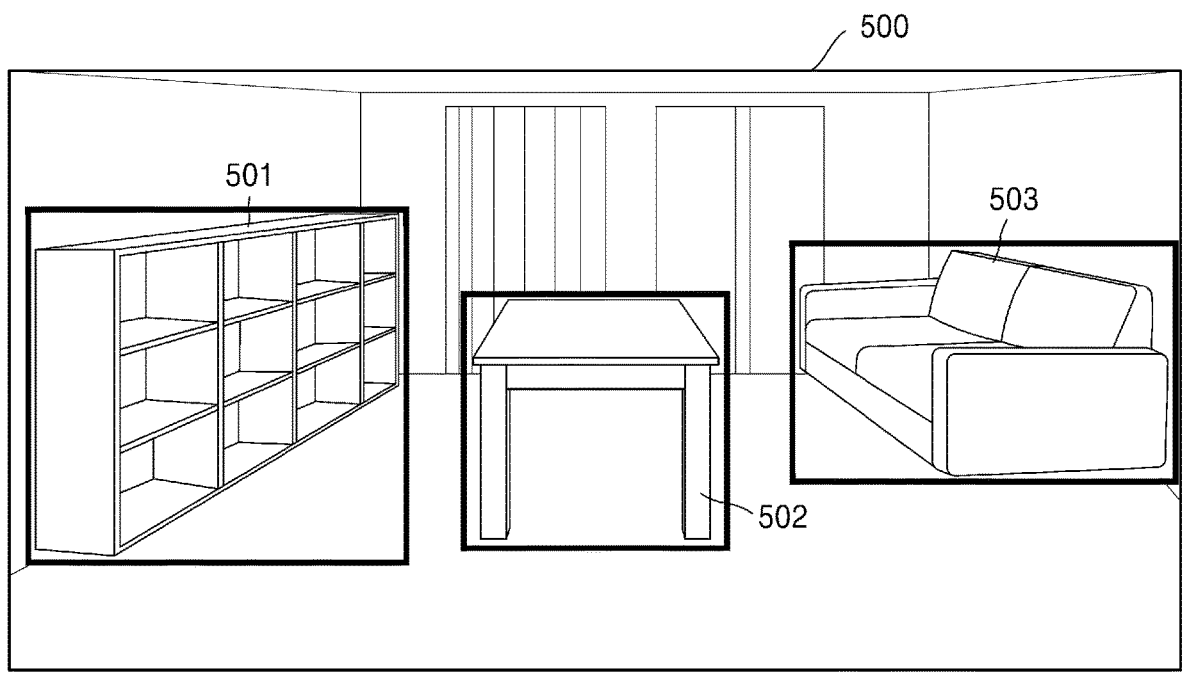
FIG. 6 is a view for describing an example of obtaining an image including at least one object in an electronic device, according to an embodiment.
Figure 7:
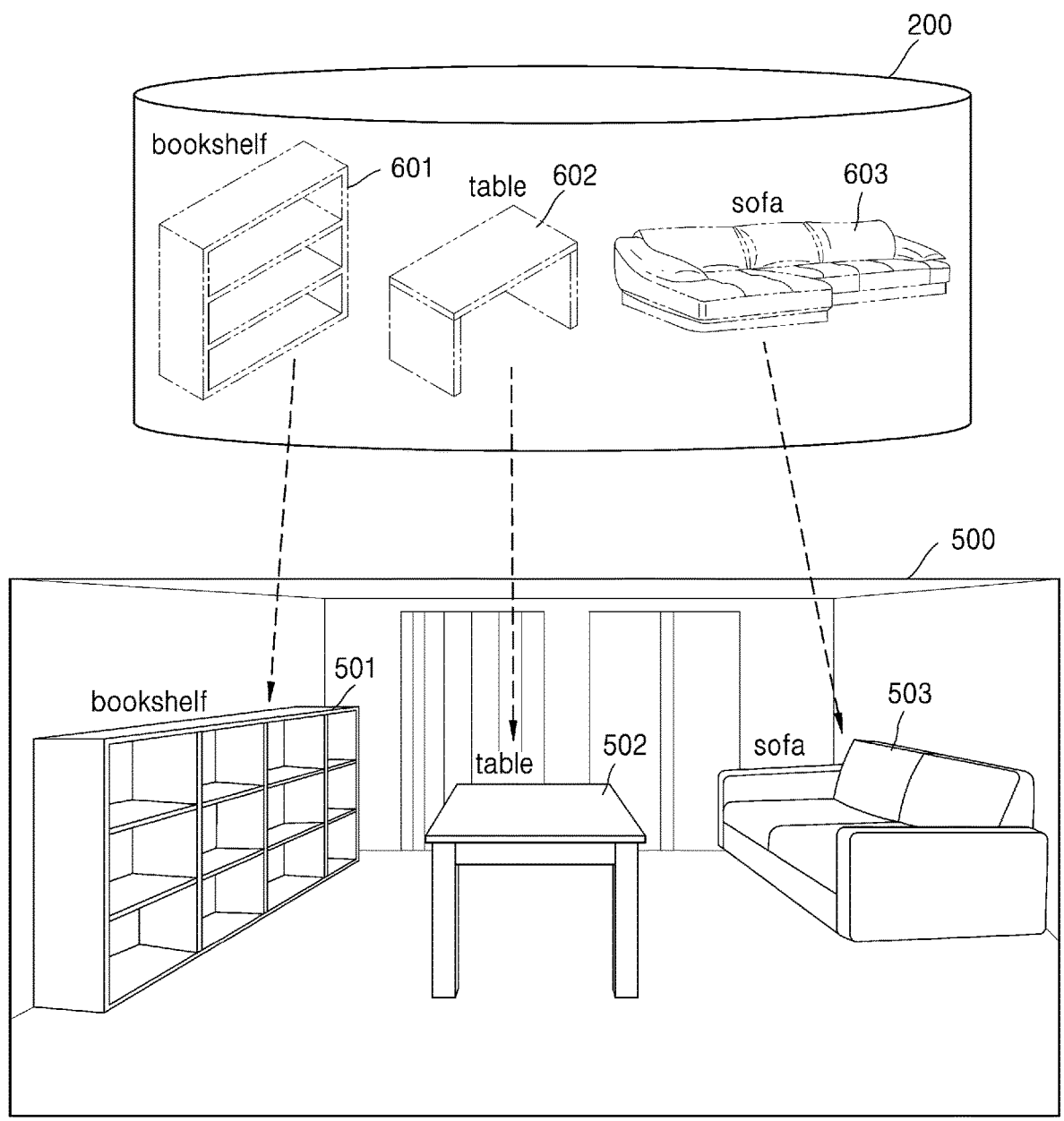
FIG. 7 is a view for describing an example of spatial information corresponding to an object type, according to an embodiment.

FIG. 4 is a flowchart for describing operations of an electronic device according to an embodiment. FIG. 5 is a flowchart for describing a method of obtaining spatial information from an external server in an electronic device according to an embodiment. FIG. 6 is a view for describing an example of obtaining an image including at least one object in an electronic device according to an embodiment. FIG. 7 is a view for describing an example of spatial information corresponding to an object type according to an embodiment. FIGS. 6 and 7 are views referred to describe flowcharts of FIGS. 4 and 5.

In operation S401 of FIG. 4, the electronic device 100 may obtain an image including at least one object through the camera 175.

According to an embodiment, when a preset application requiring displaying of a virtual image is executed, the electronic device 100 may obtain an image by photographing surroundings of the electronic device through the camera 175. Also, the electronic device 100 may obtain an image by photographing surroundings of the electronic device 100 through the camera 175 at preset time intervals.

According to an embodiment, the image obtained through the camera 175 may be a 2D image obtained by photographing at least one real object included in a real scene.

In FIG. 6, the electronic device 100 may obtain a 2D image 500 by photographing a real scene of a FOV through the camera 175. For example, the 2D image 500 may include a first object 501, a second object 502, and a third object 503.

In operation S402 of FIG. 4, the electronic device 100 may identify an object type of the at least one object.

According to an embodiment, the electronic device 100 may detect at least one object included in the 2D image 500 from the 2D image 500 by using a preset object detection algorithm.

According to an embodiment, the electronic device 100 may identify an object type of the detected object. The electronic device 100 may identify the object type of the object by using a trained model trained by using an AI algorithm to identify an object type of an object.

In FIG. 7, for example, the electronic device 100 may identify that an object type of the first object 501 is bookshelf, an object type of the second object 502 is table, and an object type of the third object 503 is sofa.

In operation S403 of FIG. 4, the electronic device 100 may obtain spatial information corresponding to the object type, based on the identified object type.

According to an embodiment, the electronic device 100 may transmit a spatial information request signal including information about the object type to the external server 200, and receive spatial information corresponding to the objet type from the external server 200.

In FIG. 7, the electronic device 100 may obtain first spatial information including a first 3D shape 601 corresponding to bookshelf as a first object type of the first object 501 from the external server 200. Also, the electronic device 100 may obtain second spatial information including a second 3D shape 602 corresponding to table as a second object type of the second object 502 from the external server 200. Also, the electronic device 100 may obtain third spatial information including a third 3D shape 603 corresponding to sofa as a third object type of the third object 503 from the external server 200.

A method of obtaining spatial information from the external server 200 will be described in more detail with reference to FIG. 5 which will be described at a later time.

In operation S404 of FIG. 4, the electronic device 100 may display a virtual object through the display 140 based on the obtained spatial information.

According to an embodiment, the electronic device 100 may generate 3D shape information corresponding to a size and orientation of an object included in the image obtained by the camera 175 (see FIG. 3), based on the spatial information corresponding to the object type.

A method of generating 3D shape information will be described in more detail with reference to FIGS. 8 and 9 which will be described at a later time.

FIG. 5 is a flowchart for describing a method of obtaining spatial information from an external server in an electronic device.

In operation S501 of FIG. 5, the external server 200 may store spatial information for object types.

According to an embodiment, the spatial information for object types may include information about a 3D shape representing a preset object type.

In FIG. 7, the external server 200 may store the first spatial information including the first 3D shape 601 representing bookshelf, the second spatial information including the second 3D shape 602 representing table, and the third spatial information including the third 3D shape 603 representing sofa.

In operation S502 of FIG. 5, the electronic device 100 may identify an object type of at least one object included in an image obtained by the camera 175 (see FIG. 3). In operation S503, the electronic device 100 may transmit a spatial information request signal including information about the object type to the external server 200.

In FIG. 7, the electronic device 100 may transmit a spatial information request signal including information about an object type (for example, bookshelf, table, or sofa) of an object included in a 2D image to the external server 200, thereby requesting spatial information including a 3D shape corresponding to the object type.

In operation S504 of FIG. 5, the external server 200 may determine spatial information corresponding to the object type.

In FIG. 7, the external server 200 may extract the first spatial information including the first 3D shape 601 corresponding to bookshelf, the second spatial information including the second 3D shape 602 corresponding to table, or the third spatial information including the third 3D shape 603 corresponding to sofa, from the spatial information about 3D shapes for object types, stored in the memory 230 (see FIG. 12) of the external server 200, based on the information about the object type (for example, bookshelf, table, or sofa), received from the electronic device 100.

According to an embodiment, a 3D shape corresponding to an object type may not be exactly identical to a shape of a real object included in an image obtained by the camera 175 (see FIG. 3). A 3D shape corresponding to an object type, stored in the external server 200, may be a universal, common 3D shape of objects having the same object type.

In operation S505 of FIG. 5, the electronic device 100 may receive the spatial information corresponding to the object type from the external server 200.

In FIG. 7, the external server 200 may transmit the first spatial information including the first 3D shape 601 corresponding to bookshelf, the second spatial information including the second 3D shape 602 corresponding to table, and the third spatial information including the third 3D shape 603 corresponding to sofa to the electronic device 100.

In operation S506 of FIG. 5, the electronic device 100 may display a virtual object through the display 140 (see FIG. 3), based on the obtained spatial information.

The electronic device 100 may generate 3D shape information corresponding to a size and orientation of the object included in the image obtained by the camera 175, based on the spatial information corresponding to the object type. The electronic device 100 may display a virtual object through the display 140 (see FIG. 3), based on the 3D shape information.

In FIG. 7, the electronic device 100 may adjust a size and orientation of the first 3D shape 601 corresponding to bookshelf according to the first object 501 included in the 2D image 500, adjust a size and orientation of the second 3D shape 602 corresponding to table according to the second object 502 included in the 2D image 500, and adjust a size and orientation of the third 3D shape 603 corresponding to sofa according to the third object 503 included in the 2D image 500.

A method of generating 3D shape information will be described in more detail with reference to FIGS. 8 and 9 which will be described below.

Figure 8:
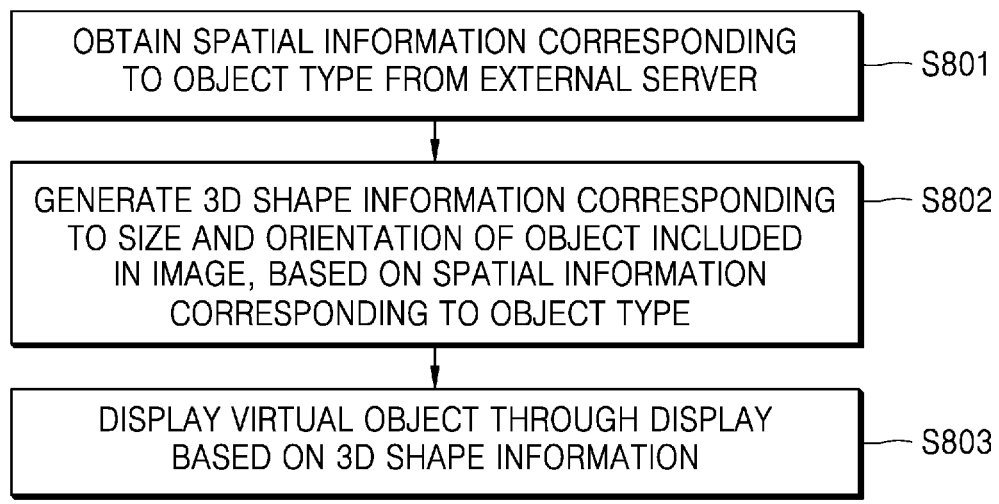
FIG. 8 is a flowchart for describing a method of generating three-dimensional (3D) shape information, according to an embodiment.
Figure 9A:
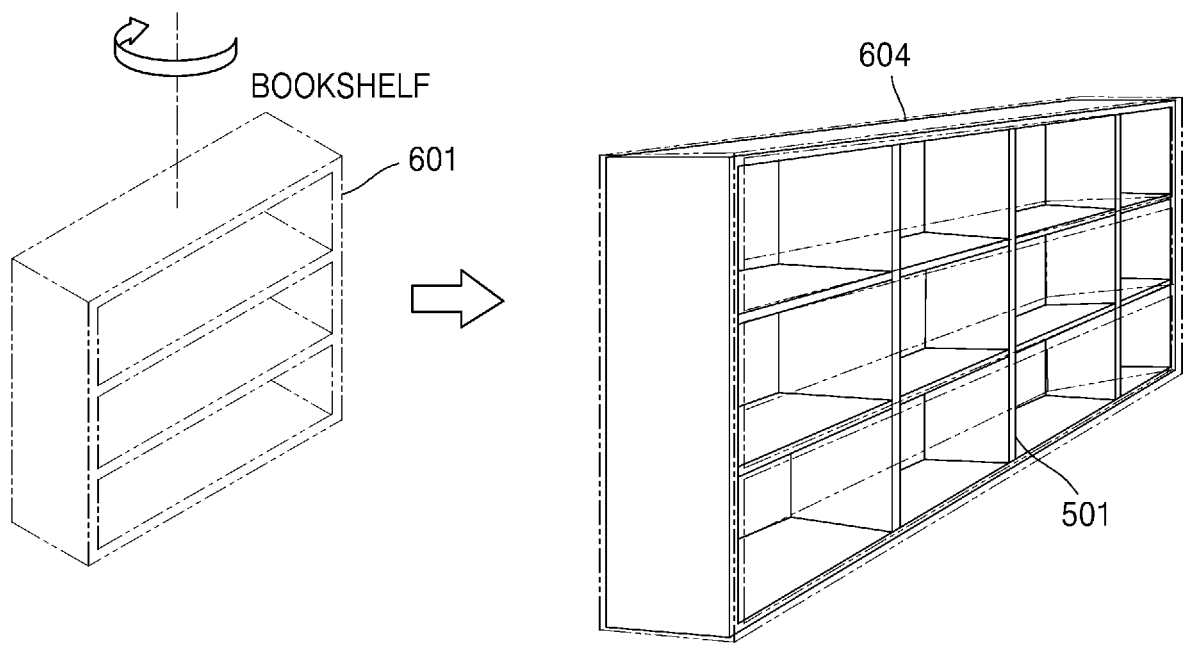
FIG. 9A is an exemplary view for describing a method of generating 3D shape information, according to an embodiment.
Figure 9B:
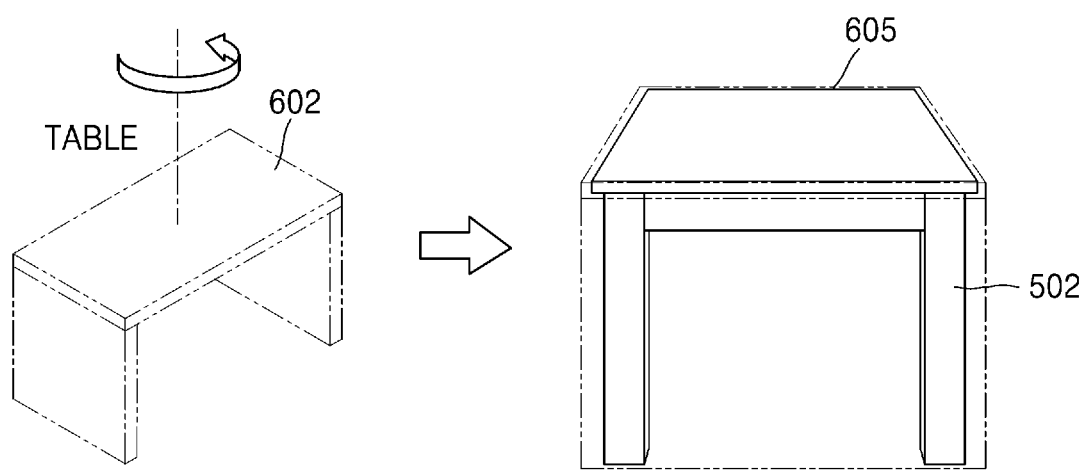
FIG. 9B is an exemplary view for describing a method of generating 3D shape information, according to an embodiment.
Figure 9C:
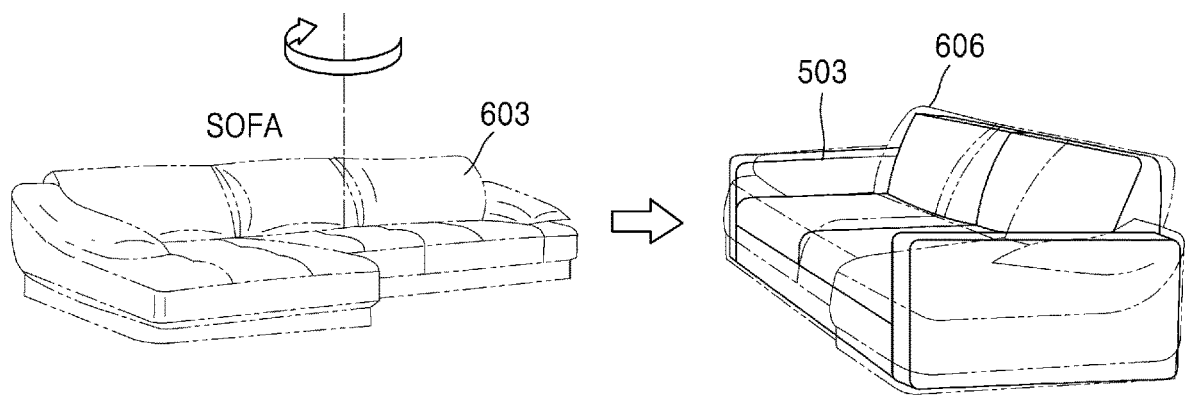
FIG. 9C is an exemplary view for describing a method of generating 3D shape information, according to an embodiment.
Figure 10:
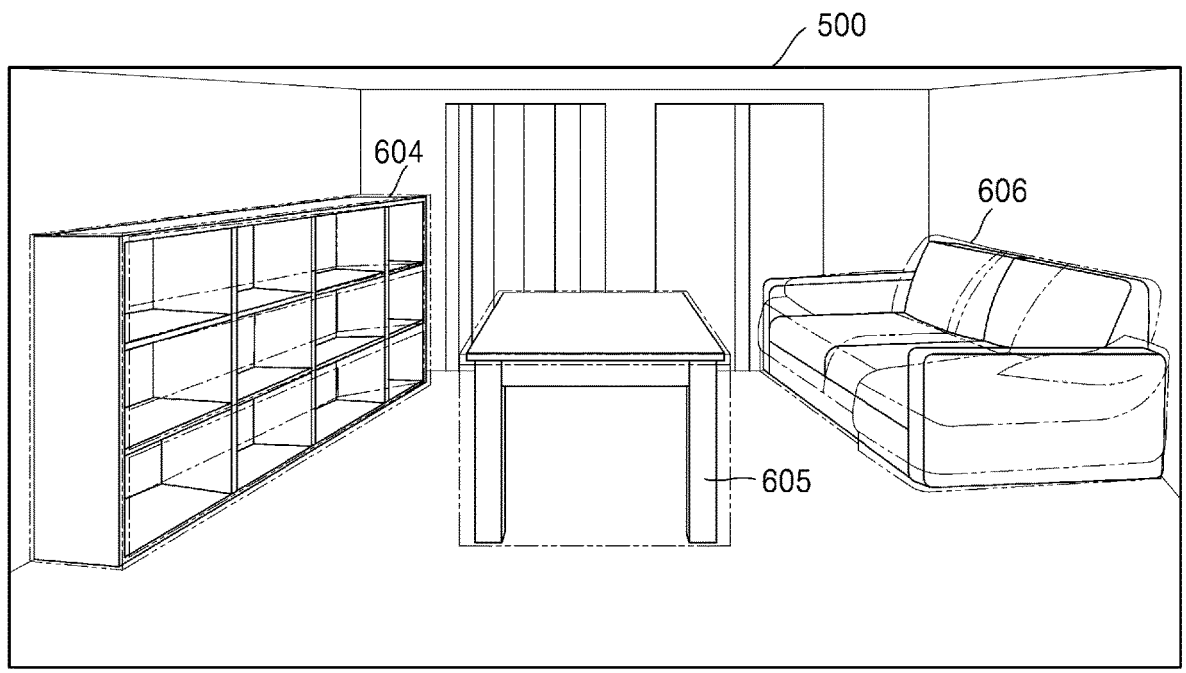
FIG. 10 is a view for describing an example of 3D shape information according to an embodiment.
Figure 11:
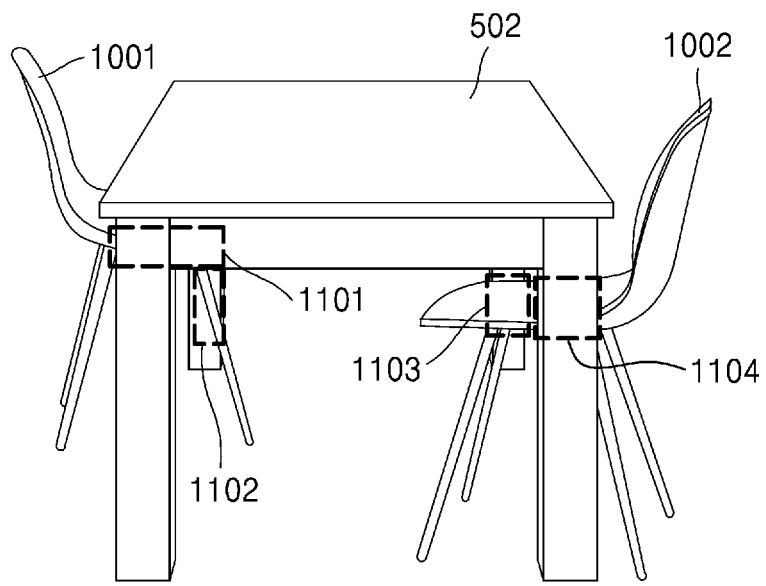
FIG. 11 is a view for describing an example of displaying a virtual object, according to an embodiment.

FIG. 8 is a flowchart for describing a method of generating 3D shape information according to an embodiment. FIGS. 9A, 9B, and 9C are exemplary views for describing a method of generating 3D shape information according to an embodiment. FIG. 10 is a view for describing an example of 3D shape information according to an embodiment. FIG. 11 is a view for describing an example of displaying a virtual object according to an embodiment. FIGS. 9A, 9B, and 9C, 10, and 11 are views referred to describe the flowchart of FIG. 8.

In operation S801 of FIG. 8, the electronic device 100 may obtain spatial information corresponding to an object type from the external server 200.

In FIGS. 9A, 9B, and 9C, for example, the electronic device 100 may obtain the first 3D shape 601 corresponding to bookshelf, the second 3D shape 602 corresponding to table, and the third 3D shape 603 corresponding to sofa, from spatial information for object types, stored in the memory 230 (see FIG. 12) of the external server 200, based on information about object types (for example, information about bookshelf, table, and sofa).

In operation S802 of FIG. 8, the electronic device 100 may generate 3D shape information corresponding to a size and orientation of an object included in an image, based on the spatial information corresponding to the object type.

In FIG. 9A, the electronic device 100 may adjust a size and orientation of a first 3D shape 601 obtained from the external server 200 according to a first object 501 included in a 2D image. The electronic device 100 may zoom in or out the size of the first 3D shape 601 such that the size of the first 3D image 601 is approximately identical to a size of the first object 501 within a preset range. Also, the electronic device 100 may determine the orientation of the first 3D shape 601 by rotating the first 3D shape 601 with respect to a preset central axis such that the orientation of the first 3D shape 601 is approximately identical to orientation of the first object 501 included in the 2D image within a preset range. Accordingly, the electronic device 100 may generate first 3D shape information including a 3D shape 604 of which a size and orientation are approximately identical to those of the first object 501 included in the 2D image within the preset ranges.

In FIG. 9B, the electronic device 100 may adjust a size and orientation of a second 3D shape 602, obtained from the external server 200, according to a second object 502 included in the 2D image. The electronic device 100 may zoom in or out the size of the second 3D shape 602 such that the size of the second 3D shape 602 is approximately identical to that of the second object 502 within a preset range. Also, the electronic device 100 may determine the orientation of the second 3D shape 602 by rotating the second 3D shape 602 with respect to a preset central axis such that the orientation of the second 3D shape 602 is approximately identical to that of the second object 502 included in the 2D image within a preset range. Accordingly, the electronic device 100 may generate second 3D shape information including a 3D shape 605 of which a size and orientation are approximately identical to those of the second object 502 included in the 2D image within the preset ranges.

In FIG. 9C, the electronic device 100 may adjust a size and orientation of a third 3D shape 603, obtained from the external server 200, according to a third object 503 included in the 2D image. The electronic device 100 may zoom in or out the size of the third 3D shape 603 such that the size of the third 3D shape 603 is approximately identical to that of the third object 503 within a preset range. Also, the electronic device 100 may determine the orientation of the third 3D shape 603 by rotating the third 3D shape 603 with respect to a preset central axis such that the orientation of the third 3D shape 603 is approximately identical to that of the third object 503 included in the 2D image within a preset range. Accordingly, the electronic device 100 may generate third 3D shape information including a 3D shape 606 of which a size and orientation are approximately identical to those of the third object 503 included in the 2D image within the preset ranges.

According to an embodiment of the disclosure, the electronic device 100 may generate 3D shape information including the 3D shapes 604, 605, and 606 respectively corresponding to the plurality of first, second, and third objects 501, 502, and 503.

In FIG. 10, the electronic device 100 may store a combination of the 3D shape information including the 3D shapes 604, 605, and 606 respectively corresponding to the plurality of first, second, and third objects 501, 502, and 503 included in the 2D image 500, in the memory 130 (see FIG. 3).

According to an embodiment, a 3D shape included in spatial information corresponding to an object type may be not exactly identical to a shape of a real object included in an image. Accordingly, in FIG. 10, the 3D shapes 604, 605, and 606 included in the 3D shape information generated based on spatial information may be not exactly identical to real objects included in the 2D image 500.

In operation S803 of FIG. 8, the electronic device 100 may display a virtual object through the display 140 (see FIG. 3) based on the 3D shape information.

The electronic device 100 may display a virtual object around the first, second, and third objects 501, 502, and 503, based on the combination of the 3D shape information respectively corresponding to the plurality of first, second, and third objects 501, 502, and 503 included in the 2D image 500.

The electronic device 100 may display a virtual object through the display 140 (see FIG. 3) such that the virtual object looks as though it exists around a real object included in a 2D image, by using 3D shape information corresponding to the real object. The electronic device 100 may display the virtual object in such a way to display an area of the virtual object, located in front of the real object and not obstructed by the real object, through the display 140 (see FIG. 3), without displaying an area of the virtual object, obstructed by the real object.

In FIG. 11, the electronic device 100 may display virtual objects 1001 and 1002 each having a chair shape around the second object 502 (for example, a table) which is a real object included in the 2D image 500.

The electronic device 100 may display the virtual objects 1101 and 1102 such that the virtual objects 1101 and 1102 (chair shape) look as though they are positioned around the second object 502 (table), by using 3D shape information including the 3D shape 605 (see FIG. 10) corresponding to the second object 502.

For example, the electronic device 100 may display areas 1102 and 1103 not obstructed by the second object 502, through the display 140, without displaying areas 1101 and 1104 obstructed by the second object 502, among overlapping areas between the virtual objects 1001 and 1002 and the second object 502 as a real object. Accordingly, the electronic device 100 may provide an obstruction effect with respect to an overlapping area between a real object and a virtual object.

Figure 12:
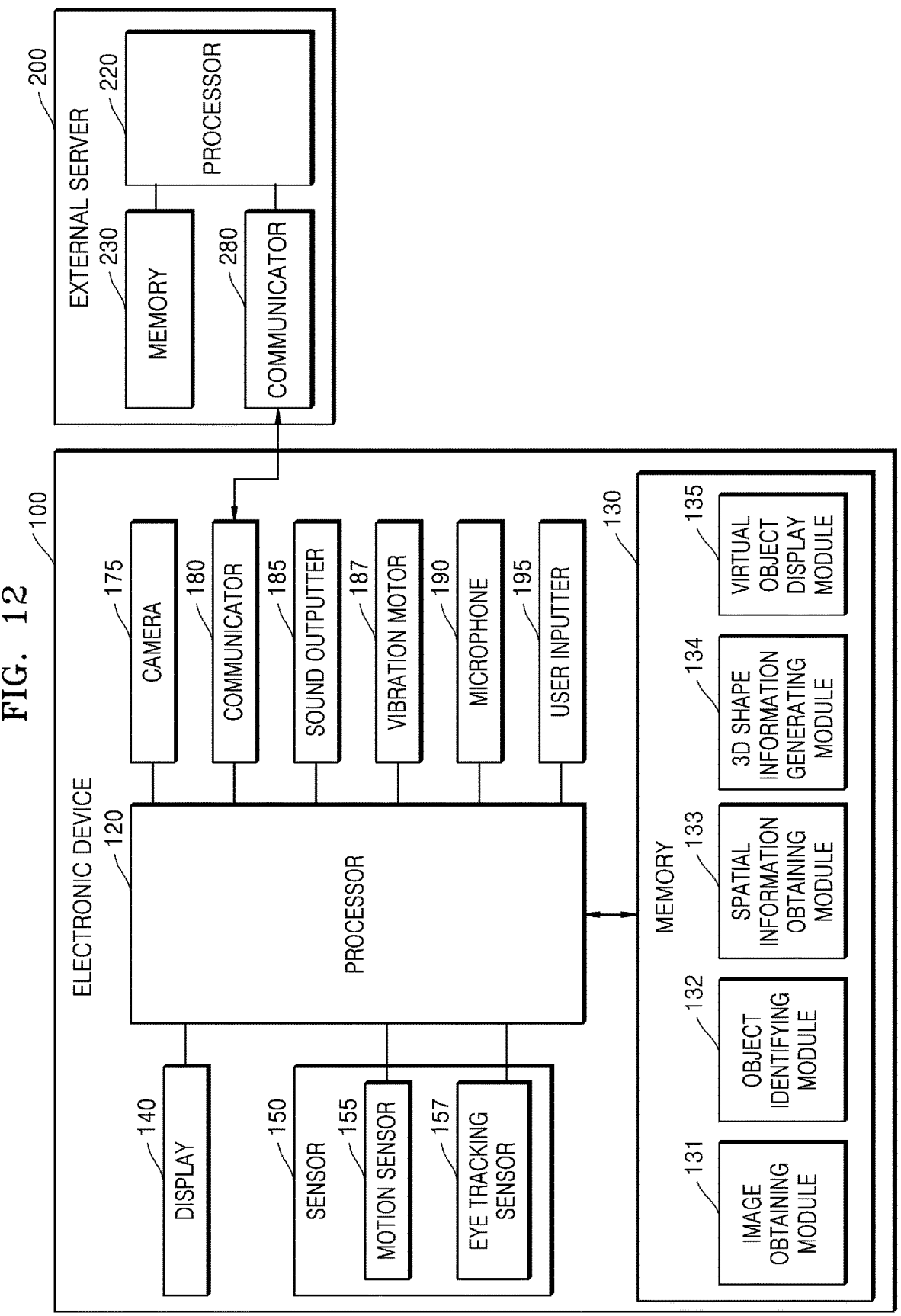
FIG. 12 is a block diagram of an electronic device according to an embodiment, and an external server.

FIG. 12 is a block diagram of an electronic device according to an embodiment and an external server.

Components of the electronic device 100 illustrated in FIG. 12 may correspond to those of the electronic device 100 illustrated in FIG. 3, and therefore, descriptions thereof will be omitted.

According to an embodiment of the disclosure, the electronic device 100 may transmit/receive data to/from the external server 200 through the communicator 180.

The external server 200 illustrated in FIG. 12 may include a processor 220, the memory 230, and the communicator 280. However, the components shown in FIG. 12 may not be indispensable components of the external server 200. The external server 200 may be implemented with more components than those illustrated in FIG. 12 or less components than those illustrated in FIG. 12.

The processor 220 according to an embodiment may control overall operations of the external server 200. The processor 220 may be configured with a single processor or a plurality of processors. The processor 220 according to an embodiment of the disclosure may execute one or more programs stored in the memory 230.

The memory 230 according to an embodiment of the disclosure may store various data, programs, or applications for driving and controlling the external server 200. The programs stored in the memory 230 may include one or more instructions. The programs (one or more instructions) or applications stored in the memory 230 may be executed by the processor 220.

The memory 230 according to an embodiment may store programs for processing and controlling the processor 220. The programs stored in the memory 230 may be classified into a plurality of modules according to their functions.

The memory 230 according to an embodiment may store spatial information including 3D shapes for object types in a form of a table. Also, the memory 230 may store spatial information including 3D shapes for object types in a form of an algorithm for detecting 3D shapes corresponding to object types.

The communicator 280 may include one or more components for enabling communications between the external server 200 and the electronic device 100 or between the external server 200 and an external device (not shown).

For example, the communicator 280 may include a short-range communicator and a mobile communicator.

The short-range communicator may include a Bluetooth communicator, a short-range wireless communicator (NFC/RFID), a WLAN (Wi-Fi) communicator, a Zigbee communicator, an IrDA communicator, a UWB communicator, an Ant+ communicator, etc., although not limited thereto.

The mobile communicator may transmit/receive a wireless signal to/from at least one of a base station, an external terminal, or a server on a mobile communication network. Herein, the wireless signal may include a voice call signal, a video call signal or various formats of data according to transmission/reception of text/multimedia messages.

According to an embodiment, the external server 200 may receive a spatial information request signal including information about an object type from the electronic device 100, through the communicator 280. Also, the external server 200 may transmit spatial information corresponding to an object type to the electronic device 100, through the communicator 280.

Meanwhile, the embodiments as described above may be written as a program that is executable on a computer, and implemented on a general-purpose digital computer that operates the program using a computer-readable recording medium. Also, a data structure used in the above-described embodiments of the disclosure may be recorded on a computer-readable medium through various means. Also, the above-described embodiments may be implemented in a form of a recording medium including an instruction that is executable by a computer, such as a program module that is executed by a computer. For example, the methods may be implemented as a software module or an algorithm and may be stored on computer-readable recording medium as computer-readable and executable codes or program commands.

The computer-readable medium may be arbitrary recording medium that is accessible by a computer, and may include volatile and non-volatile media and separable and non-separable media. Examples of the computer-readable recording medium may include magnetic storage media (for example, read only memory (ROM), floppy disks, hard disks, etc.) and optical recording media (for example, compact disc-read only memory (CD-ROM), or digital versatile disc (DVD)), although not limited thereto. Also, the computer-readable medium may include computer storage medium and communication medium.

Also, a plurality of computer-readable recording media may be distributed to computer systems over a network, and data (for example, program instructions and codes) stored in the distributed storage media may be executed by at least one computer.

Specific executions described in the disclosure may be an embodiment, and do not limit the scope of the disclosure by any method. For brevity of description, descriptions of typical electronic configurations, control systems, software, and other functional aspects of such systems may be omitted.

The aforementioned descriptions are only for illustrative purposes, and it will be apparent that those of ordinary skill in the art may make various modifications thereto without changing the technical spirit and essential features of the present disclosure. Thus, it should be understood that the exemplary embodiments described above are merely for illustrative purposes and not for limitation purposes in all aspects. For example, each component described as a single type may be implemented in a distributed type, and components described as distributed may be implemented in a combined form.

The use of all examples or exemplary terms, e.g., "etc.," in the disclosure is for the purpose of describing the disclosure in detail and is not intended to be limited by the scope of the claims, but is not limited thereto.

Also, unless stated to the contrary, such as "essential", "importantly", etc., the components described in this disclosure may not be essential components for the performance of the disclosure.

It is to be understood that the disclosure is not limited by the specific embodiments described in the specification and that various changes and modifications may be made therein without departing from the spirit and scope of the present disclosure.

It is to be understood that the disclosure is not limited by the specific embodiments described in the specification and that various changes and modifications may be made therein without departing from the spirit and scope of the disclosure, and substitutions are to be understood as being included in this disclosure. Therefore, the disclosed embodiments should be understood in an illustrative rather than a restrictive sense.

The scope of the disclosure is defined by the appended claims rather than the detailed description of the disclosure, and all changes or modifications derived from the meaning and scope of the claims and their equivalents should be construed as being included within the scope of the disclosure.

As used herein, the terms "portion", "module", or "unit" refers to a unit that can perform at least one function or operation, and may be implemented as hardware, software, or a combination of hardware and software.

The "portion", "module", or "unit" may be stored in an addressable storage medium, or may be implemented by a program that can be executed by a processor.

For example, the "portion", "module", or "unit" may be implemented by components, such as software components, object-oriented software components, class components, and task components; and processes, functions, attributes, procedures, sub-routines, segments of program codes, drivers, firmware, microcodes, circuits, data, databases, data structures, tables, arrays, and variables.

In this specification, the description "A may include one of a1, a2 or a3" has a broad meaning that an exemplary element that may be included in an element A is a1, a2 or a3.

Thus, elements that may form the element A are not necessarily limited to a1, a2, and a3. Thus, such an expression should not be exclusively interpreted that the element A only includes a1, a2, and a3.

Also, such an expression means that the element A may include a1, may include a2, or may include a3. The expression does not mean that the elements forming the element A are definitely selectively determined within a certain group. For example, the expression should not be interpreted that the element A necessarily includes a1, a2, or a3 selected from the group consisting of a1, a2, and a3.

Although embodiments have been described for illustrative purposes, those skilled in the art will appreciate that various modifications, additions and substitutions are possible, without departing from the scope and spirit of the disclosure. These modifications should also be understood to fall within the scope of the disclosure.

The invention claimed is:

1. An electronic device comprising:
 a camera;
 a display;
 a memory storing one or more instructions; and
 a processor configured to execute the one or more instructions to:
  obtain an image comprising at least one object through the camera,
  identify an object type of the at least one object,
  obtain spatial information corresponding to the identified object type, based on the object type, and
  control the display, to display a virtual object, based on the obtained spatial information.

2. The electronic device of claim 1, wherein the processor is further configured to execute the one or more instructions to:
 transmit, to an external server, a spatial information request signal comprising information about the object type, and
 receive, from the external server, the spatial information corresponding to the object type.

3. The electronic device of claim 1, wherein the processor is further configured to execute the one or more instructions to:
 generate a three-dimensional (3D) shape information corresponding to a size and orientation of the object included in the image, based on the spatial information corresponding to the object type, and
 control the display, to display, the virtual object, based on the 3D shape information.

4. The electronic device of claim 1, wherein the processor is further configured to execute the one or more instructions to control the display, to display, the virtual object such that the virtual object appears around the at least one object, without displaying an area of the virtual object, obstructed by the at least one object.

5. The electronic device of claim 1, wherein the processor is further configured to execute the one or more instructions to identify the object type of the object included in the image by using a trained model trained by using an artificial intelligence model to identify an object type of an object.

6. The electronic device of claim 1, wherein the spatial information corresponding to the object type includes a 3D shape representing the object type.

7. An operating method of an electronic device, the method comprising:
 obtaining an image comprising at least one object through the camera;
 identifying an object type of the at least one object;
 obtaining spatial information corresponding to the identified object type, based on the object type; and
 controlling a display, to display, a virtual object, based on the obtained spatial information.

8. The operating method of claim 7, wherein the obtaining of the spatial information comprises:
 transmitting a spatial information request signal comprising information about the object type to an external server; and
 receiving the spatial information corresponding to the object type from the external server.

9. The operating method of claim 7, further comprising:
 generating a three-dimensional (3D) shape information corresponding to a size and orientation of the object included in the image, based on the spatial information corresponding to the object type; and
 controlling the display, to display, the virtual object, based on the 3D shape information.

10. The operating method of claim 7, wherein the displaying of the virtual object comprises controlling the display, to display, the virtual object such that the virtual object appears around the at least one object, without displaying an area of the virtual object, obstructed by the at least one object.

11. The operating method of claim 7, wherein the identifying of the object type comprises identifying the object type of the object included in the image, by using a trained model trained by using an artificial intelligence model to identify an object type of an object.

12. The operating method of claim 7, wherein the spatial information corresponding to the object type includes a 3D shape representing the object type.

13. A non-transitory computer-readable recording medium having recorded thereon a program for executing a method comprising:
- obtaining an image comprising at least one object through a camera;
- identifying an object type of the at least one object;
- obtaining spatial information corresponding to the identified object type; and
- controlling a display, to display, a virtual object, based on the obtained spatial information.

* * * * *